(12) United States Patent
Gierling (10) Patent No.: US 6,350,215 B1
(45) Date of Patent: Feb. 26, 2002

(54) HYDRAULIC CONTROL SYSTEM FOR PRESSURE CONTROL OF A CVT VARIATOR WITH LIMP HOME MODE

(75) Inventor: Armin Gierling, Langenargen (DE)

(73) Assignee: ZF Batavia, L.L.C., Batavia, OH (US)

( * ) Notice: Subject to any disclaimer, the term of this patent is extended or adjusted under 35 U.S.C. 154(b) by 0 days.

(21) Appl. No.: 09/496,546

(22) Filed: Feb. 2, 2000

(30) Foreign Application Priority Data

Feb. 10, 1999 (DE) .......................................... 199 06 558

(51) Int. Cl.[7] .............................................. F16H 57/04
(52) U.S. Cl. .......................... 475/159; 475/161; 477/45
(58) Field of Search ............................... 477/45; 474/28, 474/18; 475/159, 161

(56) References Cited

U.S. PATENT DOCUMENTS

| | | | |
|---|---|---|---|
| 5,089,964 A | * 2/1992 | Morishige et al. | 477/45 X |
| 5,273,492 A | * 12/1993 | Kashiwase et al. | 474/28 X |
| 5,890,987 A | * 4/1999 | Lamers | 474/28 X |
| 5,944,626 A | * 8/1999 | Spiess et al. | 474/28 |
| 5,961,408 A | * 10/1999 | Konig et al. | 474/18 |
| 6,015,359 A | * 1/2000 | Kunii | 474/18 |

FOREIGN PATENT DOCUMENTS

| | | | |
|---|---|---|---|
| DE | 44 36 506 A1 | 4/1996 | |
| JP | 0017054 | * 1/1984 | 474/28 |
| JP | 0270255 | * 11/1988 | 474/28 |

* cited by examiner

Primary Examiner—Charles A Marmor
Assistant Examiner—Ha Ho
(74) Attorney, Agent, or Firm—Davis & Bujold PLLC (57) ABSTRACT

A hydraulic system for pressure control of a variator (7) of an automatic transmission having an electronic transmission control is connected with a lubricant circuit (10) in which at least one lubrication valve (14) and one radiator (13) are situated. Oil is fed to the hydraulic system with the lubricant circuit (10), from an oil source (4). At the same time, a hydraulic emergency device is provided which has at least one emergency valve (29) to provide a constant pressure ratio between a primary pulley set (19) and a secondary pulley set (20) of the variator (7). In addition, the system has for reducing the thermal load in the emergency operation at least one device (35, 37, 43, 45, 46, 51) by means of which in emergency operation the oil flow through the radiator (13) is increased and the pressure on one output side of the radiator (13) is reduced.

27 Claims, 6 Drawing Sheets

HYDRAULIC CONTROL SYSTEM FOR PRESSURE CONTROL OF A CVT VARIATOR WITH LIMP HOME MODE

BACKGROUND OF THE INVENTION

The invention concerns a hydraulic system for pressure actuation of a variator of an automatic transmission having an emergency running device.

To control modern automatic transmission in motor vehicles, it is known to use an electronic transmission control (EGS) with which criteria relevant to the user, such as driving comfort, driveability, and criteria relevant to safety are amply satisfied.

In the case of a defect of the electronic transmission control, emergency, programs are often provided which are designed in a manner, such that, in an emergency, a vehicle can be operated in the most extensive possible speed range. But, according to such emergency running systems, the cooling of the transmission in such a state of driving is problematic, since the heat onset in the emergency operation of the transmission must be eliminated by the cooling system of the vehicle and in the case of complete failure of the electronic transmission control, the transmission has no inherent possibility of positively acting upon the heat economy.

This particularly applies to CVT (continuously variable transmission) automatic transmissions which have a variator for continuous adjustment of a reduction ratio between a shortest possible speed ratio (LOW) and a longest possible speed ratio (overdrive, OD).

In "ATZ Automobiltechnische Zeitschrift"96 (1994) has been described such a CVT transmission, having one first cone pulley pair upon an input shaft as primary pulley set and a second cone pulley pair upon an output shaft as secondary pulley set. Each cone pulley pair consists of a first pulley axially stationary and a second pulley axially movable which provide the primary or secondary pulley as designated. Between the cone pulley pairs rotates a torque transmission member which constitutes, e.g. a link belt wound around the cone pulley pair. To adjust the primary or secondary pulley, it is actuated with a pressure medium from a pressure source, the pressure being adjusted with the aid or an electronic transmission control and of an electrohydraulic pressure-supply device.

DE 44 36 506 has disclosed a device for control of a CVT transmission in which an electronic control unit determines, via electromagnetic actuators and hydraulic valves, the pressure level of the pressure spaces of primary pulley and secondary pulley that, in particular, have not been dynamically balanced.

For a failure of the electronic control unit, an emergency device is provided, which has two pressure-regulating valves, two pressure-reducing valves and at least one emergency valve wherein a primary valve and a secondary valve provide a constant static pressure ratio or power ratio between primary pulley and secondary pulley under a constant static secondary pressure level.

From the magnitude of said static power ratio and of the dynamic forces on the pulleys in which the pressure has not been dynamically balanced, it is possible to established the magnitude of the speed ratio change of the CVT transmission from a normal operation to the emergency operation. The emergency operation is described here as a state of the CVT transmission in which have been interrupted a pressure regulation of the variator on the EGS side and a contact pressure regulation of the variator on the EGS side.

In this known device, the speed ratio of the CVT transmission changes, according to the issued torque of an internal combustion machine provided as input unit, the variable change of speed ratio in the emergency operation making a reliable start uphill and an improved driveability at high terminal speed possible.

As an input signal on an electronic control unit there are available, e.g. the signal of a load position of the input unit such as the throttle valve position in the case of an internal combustion engine, the rotational speed of the transmission input shaft, the rotational speed of the output shaft, or the temperature of the pressure medium. From the input signal, an operation point is determined and the corresponding rotational speed of the transmission input shaft or the speed ratio of the CVT transmission is adjusted. When an error occurs, the CVT transmission changes over to emergency operation in which there are no longer on the side of the EGS any rotational speed regulation and contact pressure regulation.

Even though the known solution offers an extensive possible adjustment range of the variator, it still is problematic that the contact pressure for the corresponding pulleys must be interpreted, according to the extreme corner points of the driveability range. One of said corner points is the guarantee of the maximum start up power in the lowest gear, i.e. in or near the LOW speed ratio. For the transmitting capacity of the variator, a higher contact pressure is required on the secondary pulley at the highest speed ratio and high input torque. Conditioned by the draft, the static force adjusted on the secondary pulley, the magnitude of which depends on the maximum input torque to be transmitted, is constant throughout the torque range. The speed ratio adjustment results from the draft of the constant static pressure ratio between primary pulley and secondary pulley combined with the dynamically, not balanced adjustment spaces.

In all states of operation, except during maximum output torque, however, the consequence of this is an excess of contact pressure which disadvantageously leads, during emergency operation to a high operating temperature in the variator with the consequence of an impairment of the durability of the automatic transmission with respect to the mechanics and of an electronic control unit, a blockage in the transmission oil sump (mechatronics), or a lowering of the oil quality. Other negative phenomena with increasing temperature of the variator and thus increaisng temperature of oil are increased internal leakages in the transmission and an idle power increase therewith. Thus results the problem of a requirement of a suitably dimensioned radiator.

The problem, which this invention is based, is to provide a hydraulic system for pressure actuation of a variator of a CVT automatic transmission having in the emergency operation a constant pressure ratio between primary and secondary pulleys, wherein the thermal load of the automatic transmission in emergency operation is easily and economically reduced so as to prevent damage in the automatic transmission due to heat effect during the emergency operation.

According to the invention, this problem is solved with a hydraulic system according to claim 1.

SUMMARY OF THE INVENTION

A boost of the radiator through-flow by which is achieved a cooling of the lubricant that extensively eliminates thermally conditioned damages in the automatic transmission.

According to the inventive solution, the increased heat onset in the emergency operation can be advantageously removed, via the radiator, without the dimensions thereof, being larger than for the cooling power required in normal operation, provided that in the normal operation the radiator still has not been operated on the oil side to thermodynamic saturation. Therewith is eliminated the need of a larger or additional radiator with the associated consequences of a larger installation space being required and higher costs.

BRIEF DESCRIPTION OF THE DRAWINGS

Other advantages and developments of the invention result from the subclaims and from the embodiments fundamentally described with reference to the drawings wherein:

DESCRIPTION OF THE PREFERRED EMBODIMENTS

Figures 1, 1B:
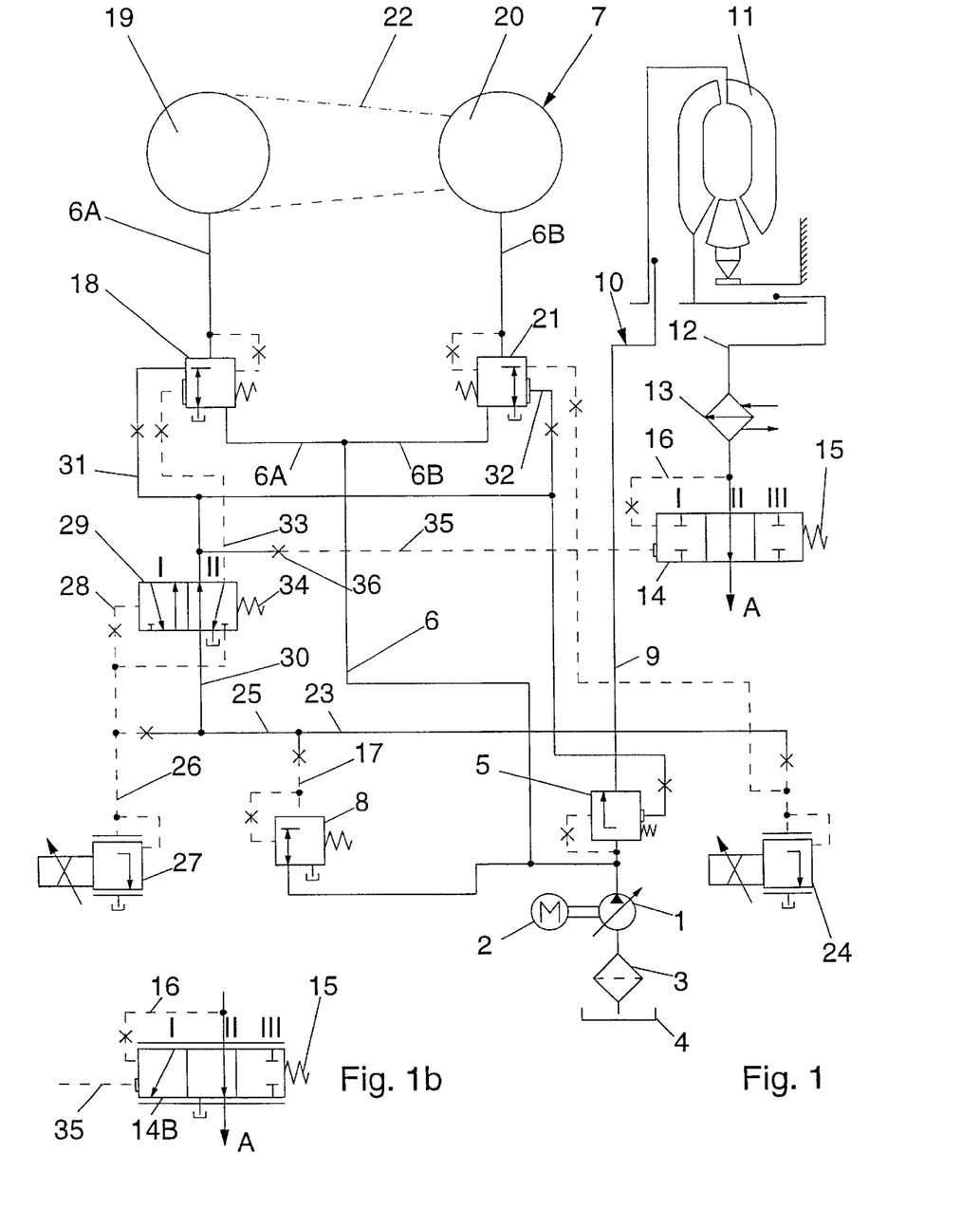
FIG. 1 is a diagrammatic representation of a first embodiment of an inventive hydraulic system.
FIG. 1b is a valve alternative of the first embodiment according to FIG. 1.

FIG. 1 diagrammatically shows a first embodiment of an inventive hydraulic system. A hydropump 1 is here driven by an engine 2 and, via a filter 3, is connected with an oil tank representing an oil source. In the delivery direction behind the hydropump 1, the oil current divides into a line that leads to a main pressure valve 5 serving as a system pressure control and a line which, in turn, divides into a pressure line 6 for pressure actuation of a variator 7 and a line leading to a pressure-reducing valve 8.

The main pressure valve 5 supplies, via a feed line 9, a lubricant oil circuit 10 connected with the hydraulic system and having located therein a hydrodynamic converter 11, the location of the converter 11 being shown in simplified form. From the converter 11, a lubricant oil line 12 extends to lubrication points, via a radiator 13, which is serially connected with a 2/3 directional lubrication valve 14 that adjusts the lubrication pressure required.

The flow rate of oil through the radiator 13 is, at the same time, proportional to the flow rate of the lubricant oil or the pressure of the lubricant oil behind the lubrication valve 14. Thereby is adjusted an amount of oil removal, which ensures the lubrication of the transmission components. The 2/3 directional lubrication valve 14 is locked in a position I and in a position III and in a position II is shifted to through flow. The lubrication valve 14 is controlled by a control line and a pressure spring 15. In addition, the lubrication valve 14 has a pressure feedback 16.

For adjustment of the converter pressure, the pressure level in the lines 9 and 12 depends primarily on the torque to be transmitted to a converter clutch not shown in particular.

The pressure line 6, leading to the variator 7, divides into two branches of which one branch 6A, as primary pressure line, actuates with pressure, a primary pulley set 19 of the variator 7. The second branch 6B actuates with oil pressure a secondary pulley set 20 via a secondary valve 21.

The variator 7 has adjacent to the primary pulley set 19 and the secondary pulley set 20 a belt 22 which surrounds the two pulley sets 19 and 20 and serves to transmit the torque.

Seen from the oil source 4 toward the pressure-reducing valve 8, a rear-inserted line 17 divides into a first line system 23 leading to a secondary pressure-regulating valve 24 and a second line system 25.

The second line system 25, in turn, divides into a line 26 leading to a primary pressure-regulating valve 27, a control line 28 for an emergency valve 29 and a pressure line 30. The pressure line 30 leads, via the emergency valve 29 designed as 4/2 directional valve, to a bifurcation by which it divides into a primary line 31 leading to the primary valve 18 and a secondary line 32 leading to the secondary valve 21.

The emergency valve 29 has two shift positions I and II. In the shift position I, the pressure line 30 is locked and a line 33, branching off from the control line 28, is completely shifted to the primary line which controls the primary valve 18. In normal operation of the transmission, the emergency valve stands in shift position I.

In the shift position II as shown in FIG. 1, the pressure line 30 is completely shifted, i.e. it branches into the lines 31 and 32 and the line 33 is locked. Between the shift positions I and II, the emergency valve 29 is adjusted by the control line 28 and a pressure spring 34. The shift position II characterizes the emergency operation of the transmission.

In the first embodiment according to FIG. 1, a control line 35 branches off between the emergency valve 29 and the bifurcation to the primary line 31 and the secondary line 32 in the pressure line 30. The control line 35 in which a diaphragm 36 is situated leads to the lubrication valve 14 and serves as device for increasing the oil flow through the radiator 13.

In regular operation, the hydraulic contact pressure of the primary pulley set 19 and of the secondary pulley set 20 is electronically regulated. At the same time, overheating of the lubricant oil is prevented by adequate regulation.

In emergency operation such as in case of failure of the electronic transmission control, the lubrication valve 14 is modulated, i.e. actuated with pressure, by the control line 35 whereby the lubrication pressure is directly controlled. The pressure control line 16 on the lubrication valve 14 serves here to servo-control the valve path (not described in detail), when oil volume/oil pressure are low. Lubrication pressure is adjusted by the control-pressure actuated valve surfaces against the spring 15.

A counterpressure is applied via the control line 35 to the spring 15 whereby the latter is relieved and the lubrication valve 14 is further opened until it has reached its maximum opening, defined as opening cross-section, for the emergency operation. At the same time, the current volume is increased on the output side of the lubrication valve 14, while on the input side of the lubrication valve 14, i.e. the side of the radiation 13, the pressure is reduced. The pressure loss leads to a follow-up control by the main pressure valve 5. As a consequence of this, the oil flow through the radiator 13 increases. The diaphragm 36 is provided to adapt the pressure on the lubrication valve 14, which is clearly lower than on the emergency valve 29.

In the hydraulic configuration described, the position of the radiator 13 can be disposed also in oil-flow direction A behind the lubrication valve 14, i.e. directly before the oil supply to the transmission parts, according to the same principle of the lubricant pressure boost in the emergency operation.

An alternative construction of the lubrication valve is shown in FIG. 1b. The lubrication valve 14B is here designed as 3/3 proportional valve.

Equal or similar parts are herebelow given the same reference numerals.

The embodiment shown in FIG. 2 corresponds essentially to the hydraulic system described with reference to FIG. 1.

Figures 2, 2B:
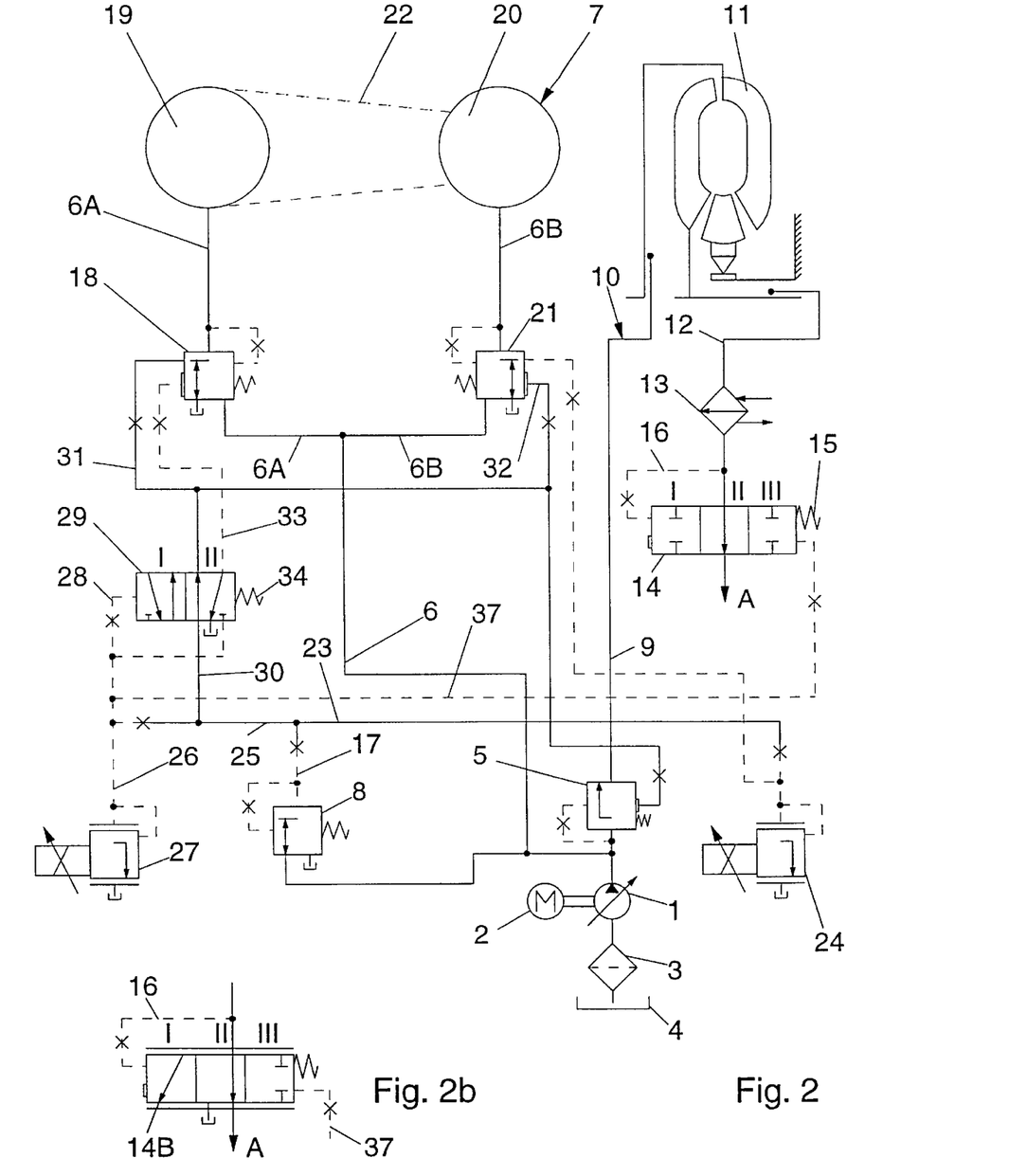
FIG. 2 is a diagrammatic representation of a second embodiment of an inventive hydraulic system.
FIG. 2b is a valve alternative of the second embodiment according to FIG. 2.

Unlike the embodiment shown in FIG. 1, in FIG. 2a control line 37, as a device for increasing the oil flow through the radiator 13, leads to the lubrication valve 14 which branches off from the control line 28 of the emergency valve 29.

The lubrication valve 14 is controlled here by the pressure drop during the emergency operation, this pressure drop in the control line 28 leading to a change over of the emergency valve 29. The configuration of the emergency valve 29 corresponds to that according to FIG. 1.

In an emergency operation, the primary pressure-regulating valve 27 of the primary pressure supply controls, by a pressure drop in the control line 26, the emergency valve 29 via the control line 28 thereof and simultaneously the lubrication valve 14 by a pressure drop in the control line 37 thereof. The pressure in the control line 37 for control of the lubrication valve 14 can here go toward zero.

In this state of a pressure drop in the spring side of the lubrication valve 14, the force supporting the spring 15 decreases and the lubrication valve 14 has a maximum opening cross-section so that the pressure on the output side of the front-mounted radiator 13 drops, which as result of the follow-up regulation by the pressure valve 5 produces an increase of the oil flow rate through the radiator 13.

Similarly to the development, according to FIG. 1, in the embodiment according to FIG. 2, the radiator 13 can also be situated in oil flow direction A behind the lubrication valve 14.

An alternative lubrication valve construction is shown in FIG. 2b where the lubrication valve 14B is designed as 3/3 proportional valve.

The embodiment shown in FIG. 3 also corresponds in essence to the hydraulic system described with reference to FIG. 1 and FIG. 2. However, the arrangement of the radiator 13 and of the lubrication valve 14 in the lubricant circuit 10 differs here from the lubricant circuit 10 shown in FIG. 1 and FIG. 2 in that the lubrication valve 14 is disposed before the radiator 13 parallel to a lubrication line 39 in which the converter 11 is fixed.

The main pressure valve 5 also supplies, via the feed line 9, the lubricant circuit 10 of the converter 11. Before the converter 11, a line 38 branches off to the lubrication valve 14. From the converter 11, parallel to the lubrication valve 14, extends to the radiator 13 a bypass line 39 which after the lubrication valve 14 combines with the line 38 to form a line 40. From the radiator, a rear-mounted line 41, in which a diaphragm 42 is situated, leads to lubrication points.

In normal operation, the radiator through flow is directly determined by the converter pressure level of the lines 38 and 39, depending on the state of the converter clutch system (not shown).

Figures 3, 3B:
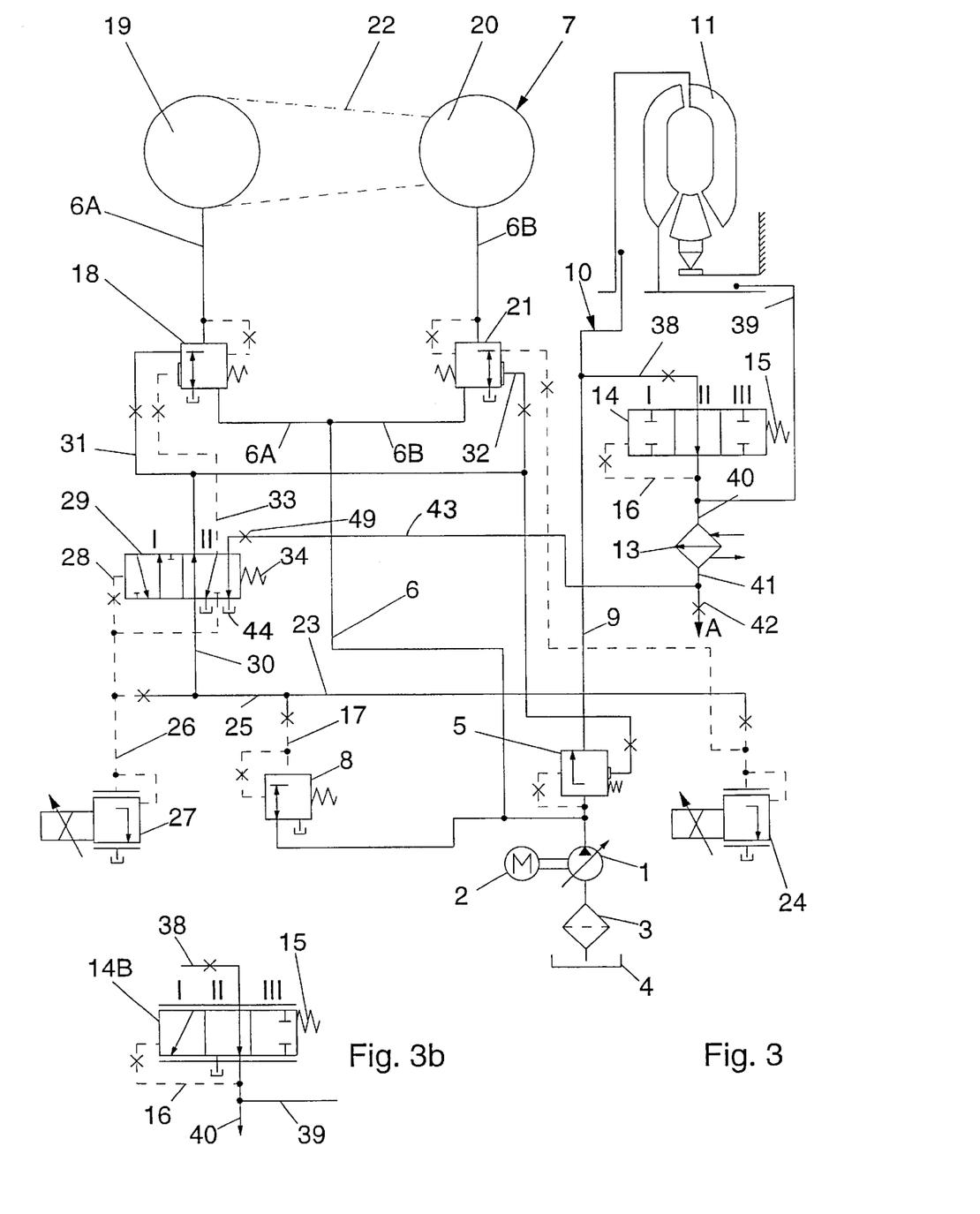
FIG. 3 is a diagrammatic representation of a third embodiment of an inventive hydraulic system.
FIG. 3b is a valve alternative of the third embodiment according to FIG. 3.

In the embodiment according to FIG. 3, as a device for increasing in emergency operation, the oil flow through the radiator 13, a line 43 is provided which leads from the line 41 disposed on the output side of the radiator 13 to the emergency valve 29.

Compared to the above described solutions, the emergency valve 29 is constructed in a manner such that in emergency operation the line 43 is shifted leading to a tank 44.

In FIG. 3, the emergency valve 29 is shown in the emergency operation position 11. In this valve position, the pressure in the line 43 is reduced by a diaphragm 49 which allows an added leakage to the tank 44. By the pressure reduction in the line 43, the flow rate in the feed line and accordingly in the lubrication valve 14 and in the radiator 13 is increased as result of the readjustment through the main pressure valve 5 whereby overheating of the lubricant circuit 10 is prevented in the emergency operation.

Similarly to the embodiments according to FIGS. 1 and 2, as alternative development of the lubrication valve, a 3/3 proportional valve 14B is proposed, as shown in FIG. 3b.

Figure 4:
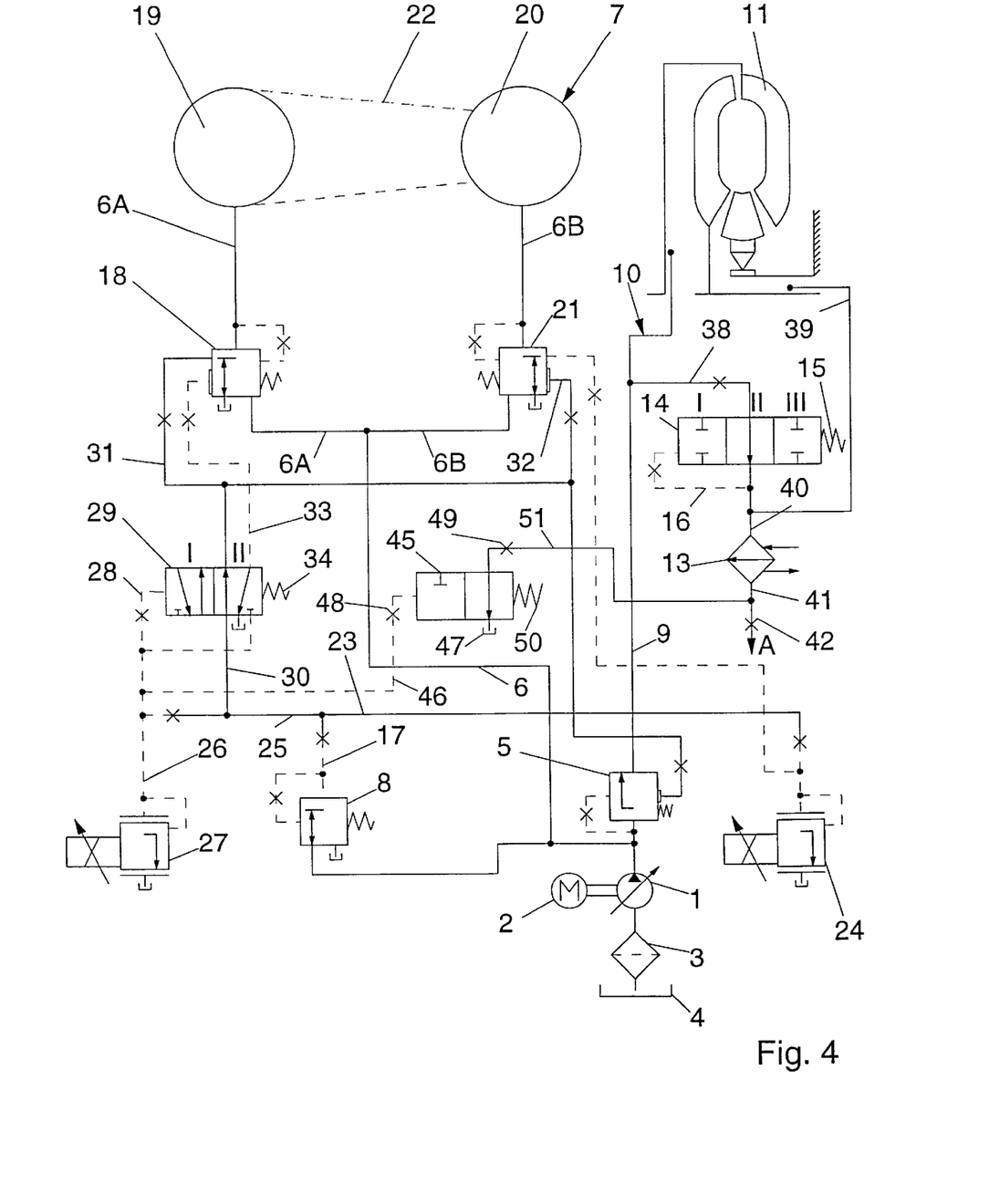
FIG. 4 is a diagrammatic representation of a fourth embodiment of an inventive hydraulic system.

FIG. 4 shows one other embodiment of a hydraulic system which substantially corresponds to the one shown in FIG. 3, since here is also provided a parallel arrangement in the lubricant circuit 10.

The emergency valve 29 is designed in this solution like in FIG. 1 and FIG. 2, i.e. no additional connection leading to the tank is provided on the emergency valve 29.

As a device to increase the oil flow through the radiator 13 serves a line 51 which connects the line 41 situated on the output side of the radiator 13 with the control line 28 that controls the emergency valve 29. In the line 51 is here disposed a radiator pressure valve 45 designed so that the zone of the line 51 leading to the radiator 13 be shifted leading to a tank 47 in the emergency operation.

The radiator pressure valve 45 designed as 2/2 directional valve is controlled by the pressure-regulating valve 27 of the primary pressure branch parallel to the emergency valve 29 via the line 46 and the feed diaphragm 48. A pressure drop in the control line 46 results in reshifting of the radiator pressure valve 45 as consequence of the prestress with the spring 50.

The oil flow through the radiator 13 is also increased here by reducing the counterpressure behind the radiator 13.

The design of the radiator pressure valve 45 according to force ensures, in combination with a diaphragm 49 in the line 51 and a diaphragm 42 upon the transmission lubrication side, the maintenance of the required amount of lubricant in the lubricant line 41 behind the radiator 13 for lubrication of the transmission components.

In an alternative, not shown, of the embodiment shown in FIG. 4, it can also be provided that the leakage be used, instead of an aeration in the tank 47, directed to added lubrication.

In the embodiment according to FIG. 4, the lubrication valve 14 can alternatively be designed also as 3/3 proportional valve, as shown in FIG. 3b as valve 14B.

Figure 5:
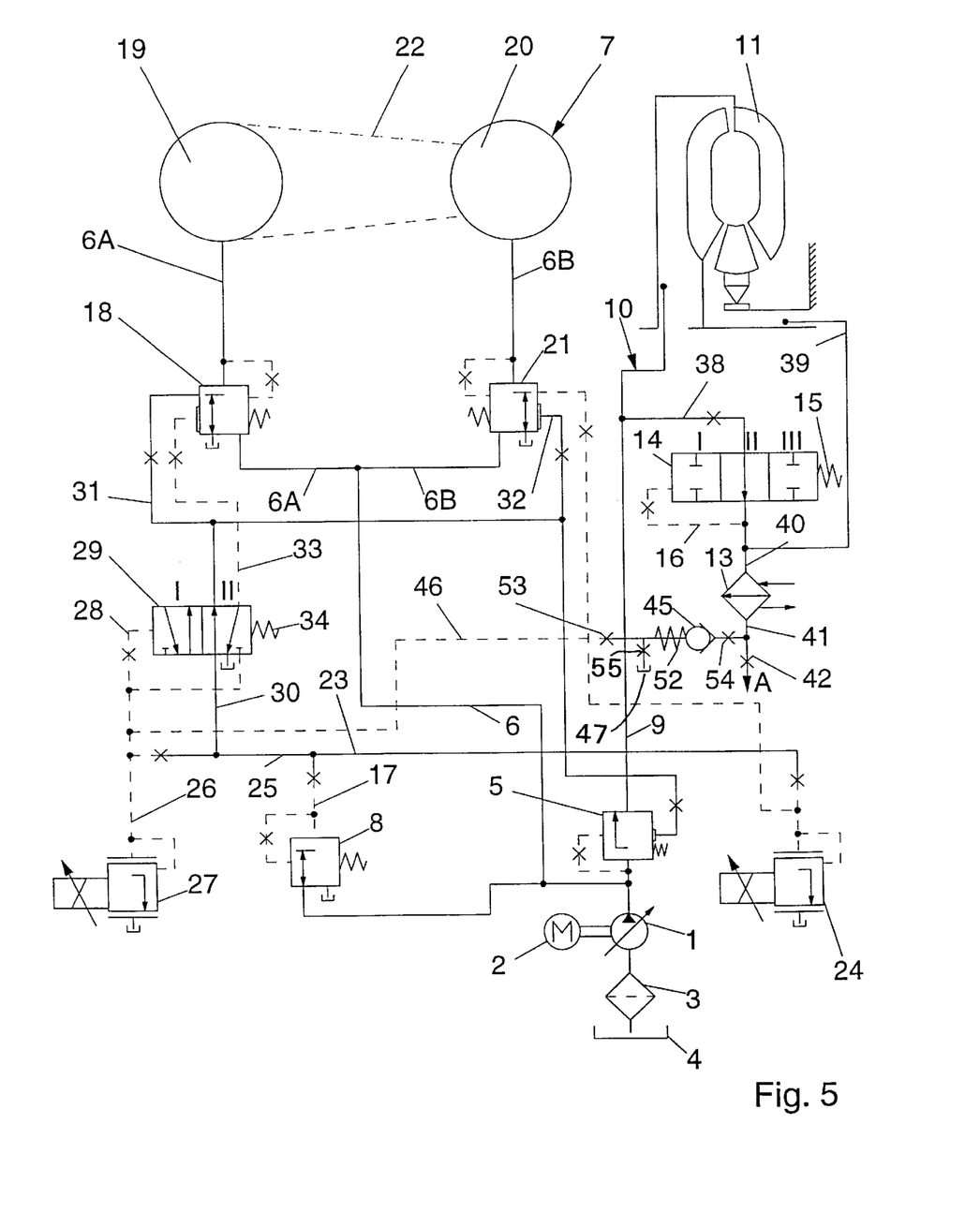
FIG. 5 is a diagrammatic representation of a fifth embodiment of an inventive hydraulic system.

FIG. 5 finally shows an embodiment of a hydraulic system which differs from the embodiment shown in FIG. 4 only by the configuration of the radiator pressure valve 45.

In the solution according to FIG. 5, the radiator pressure valve 45 in the line 46 is designed as spring-loaded, recoil valve with a branching off to the tank 47 before a diaphragm 49.

In regular operation, pressure always exists in the control line 46 so that a spring 52 of the radiator pressure valve 45 keeps the valve closed and no oil is drawn from the lubricant circuit 10 to the tank 47. In case of pressure drop in the line 26 and, accordingly in the line 46, the spring 52 of the radiator pressure valve 45 is relieved so that the valve 45 opens and lubricant can be drawn from the lubricant circuit 10 to the tank 47. The diaphragms 42, 53, 54 and 55 must be coordinated with each other so that in the line 46 at most a low residual pressure exists in order to ensure the operation of the emergency valve 29.

Figure 6:
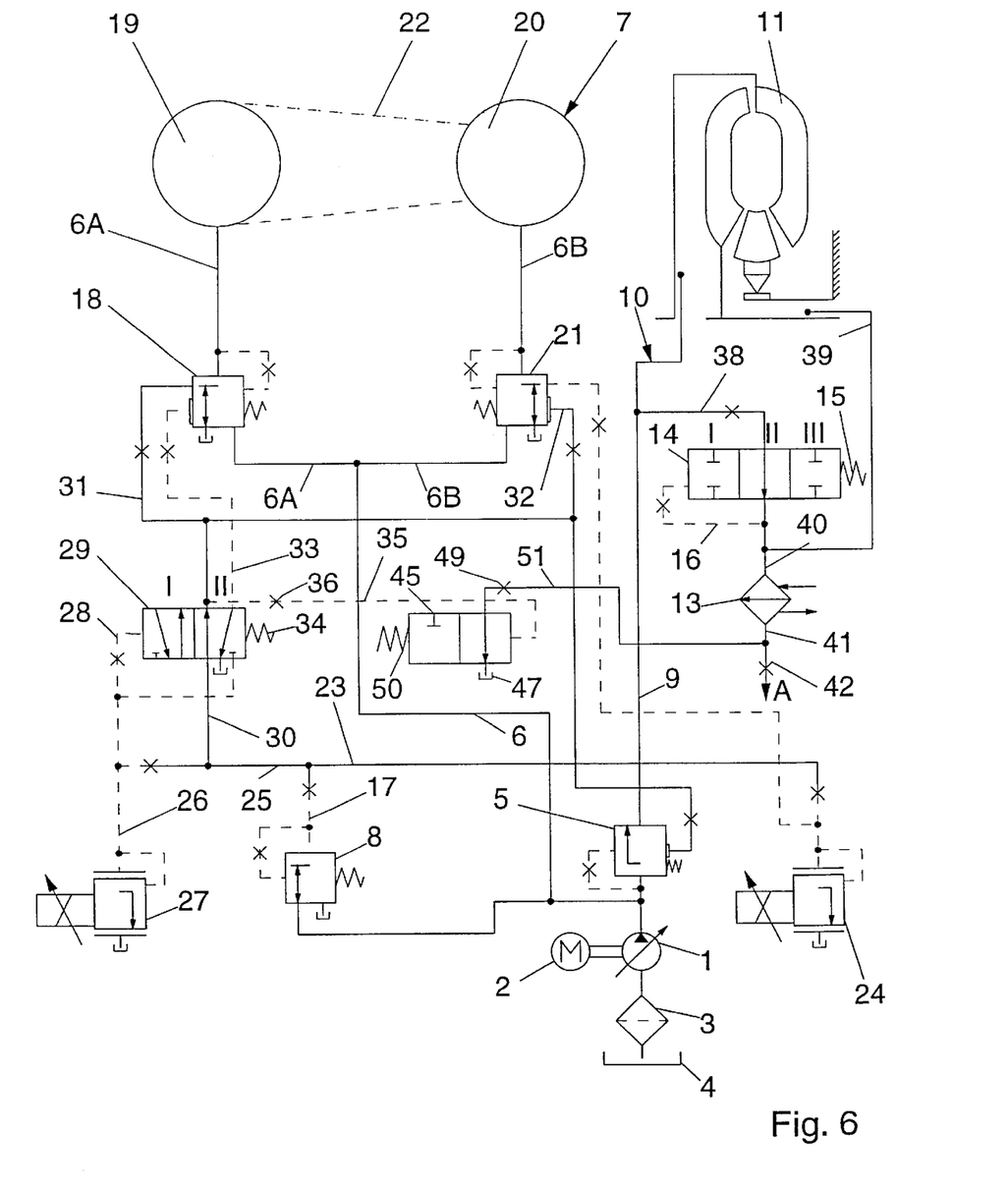
FIG. 6 is a diagrammatic representation of a sixth embodiment of an inventive hydraulic system.

FIG. 6 shows an embodiment of a hydraulic system similar to the one shown in FIG. 4.

The control of the radiator pressure valve 45, according to control pressure technology, is different. Contrary to the embodiment, according to FIG. 4, the radiator pressure valve 45 is actuated in the emergency operation with control pressure via a line 35 which, similarly to the embodiment according to FIG. 1, is provided with a diaphragm 36.

In the position 11 of the emergency valve 29, the pressure in the control line 35 abuts on the radiator pressure valve 45 and effects the reshifting thereof against the force of the spring 50 and thus the pressure drop in the line 51.

The lubrication valve 14 can alternatively be designed as 3/3 proportional valve, as shown in FIG. 3b, as valve 14B.

In each of the embodiments according to FIGS. 1 to 6, only one emergency valve 29 has been provided. It is obvious that by adequately modifying the hydraulic system, two or more emergency valves 29 can be used, e.g. separately to control the individual pressure-regulating valves of the variator and of the clutches.

| References numerals | |
|---|---|
| 1 | hydropump |
| 2 | engine |
| 3 | filter |
| 4 | oil source, oil tank |
| 5 | main pressure valve |
| 6 | pressure line |
| 6A | pressure line |
| 6B | pressure line |
| 7 | variator |
| 8 | pressure-reducing valve |
| 9 | feedline |
| 10 | lubricant circuit |
| 11 | converter |
| 12 | luricant oil line |
| 13 | radiator |
| 14 | lubrication valve |
| 14B | lubrication valve |
| 15 | pressure spring |
| 16 | pressure control line |
| 17 | line |
| 18 | primary valve |
| 19 | primary pulley set |
| 20 | secondary pulley set |
| 21 | secondary valve |
| 22 | sliding member belt |
| 23 | first line system |
| 24 | secondary press-regulating valve |
| 25 | second line system |
| 26 | control line |
| 27 | primary pressure-regulating valve |
| 28 | control line emergency valve |
| 29 | emergency valve |
| 30 | pressure line |
| 31 | primary line |
| 32 | secondary line |
| 33 | primary line |
| 34 | pressure spring |
| 35 | control line lubrication valve |
| 36 | diaphragm |
| 37 | control line lubrication valve |

| -continued | |
|---|---|
| References numerals | |
| 38 | line |
| 39 | line |
| 40 | line |
| 41 | line |
| 42 | diaphragm |
| 43 | line |
| 44 | tank |
| 45 | radiator |
| 46 | control line radiator pressure valve |
| 47 | tank |
| 48 | diaphragm |
| 49 | diaphragm |
| 50 | spring |
| 51 | line |
| 52 | spring |
| 53 | diaphragm |
| 54 | diaphragm |
| 55 | diaphragm |
| A | current direction of lubricant feed |
| I | valve position |
| II | valve position |
| III | valve position |

What is claimed is:

1. A hydraulic system having an electronic transmission control, the hydraulic system regulating hydraulic pressure supplied to a variator (7) of an automatic continuously variable transmission during operation of a motor vehicle, the hydraulic system comprising:

a source (4) of hydraulic fluid;

a pump (1) connected to the source (4) of hydraulic fluid to supply hydraulic fluid;

a system pressure circuit connected to the pump (1) to supply hydraulic fluid to the system pressure circuit to facilitate control of a primary pulley set (19) and a secondary pulley set (20) of the variator (7);

a lubricant circuit (10) connected to the pump (1) to supply hydraulic fluid thereto, the lubricant circuit (10) having at least one hydraulic emergency operating device and at least one lubrication valve (14) and one radiator (13), to facilitate lubrication of at least one component of the automatic continuously variable transmission during operation of a vehicle, and the hydraulic emergency operating device having at least one emergency valve (29) for adjusting a pressure ratio between the primary pulley set (19) and the secondary pulley set (20) of the variator (7) to a constant pressure ratio during emergency operation of the vehicle; and the hydraulic emergency operating device further including a pressure connection (35, 37, 43, 45, 46 and 51) between the system pressure circuit and a location of the lubricant circuit (10) downstream of the radiator (13) such that the at least one emergency valve (29) facilitates a reduction in a thermal load on the lubricant circuit (10), during emergency operation of the vehicle, by reducing the pressure on the downstream side of the radiator (13) to facilitate an increased flow of the hydraulic fluid through the radiator (13).

2. The hydraulic system according to claim 1, wherein the lubrication valve (14) and the radiator (13) are connected in series with one another in the lubricant circuit (10) of the hydraulic system.

3. The hydraulic system according to claim 1, wherein the lubrication valve (14) is positioned in one of an upstream position and a downstream position in the lubricant circuit (10) of the hydraulic system, relative to the radiator (13), and the lubrication valve (14) is connected parallel to a bypass line (39).

4. The hydraulic system according to claim 1, wherein the pressure connection (35, 37, 43, 45, 46 and 51) for increasing the hydraulic fluid flow through the radiator (13) comprises a control line (35) which communicates with a pressure line (30), connected to the emergency valve (29) and leading to the variator (7), and the lubrication valve (14), the lubrication valve (14) is located at one of an upstream position and a downstream position relative to the radiator (13) and is actuated by a pressure change transmitted via the control line (35) so as to increase a cross-sectional opening of the lubrication valve (14) for the emergency operation of the vehicle.

5. The hydraulic system according to claim 4, wherein the control line (35) leading to the lubrication valve (14) branches off from the pressure line (30) leading to the variator (7) in a zone located between the emergency valve (29) and the variator (7).

6. The hydraulic system according to claim 5, wherein a diaphragm (36) is provided in the control line (35) for adapting a control line pressure to the lubrication valve (14), and the control line pressure supplied to the lubrication valve (14) is lower than a pressure supplied to the emergency valve (29).

7. The hydraulic system according to claim 4, wherein the lubrication valve (14) is designed such that when a control line pressure in the control line (35) increases relative to a normal operation pressure of the hydraulic system, the lubrication valve (14) increase the cross-sectional opening of the lubrication valve (14) for the emergency operation of the vehicle.

8. The hydraulic system according to claim 1, wherein the pressure connection (35, 37, 43, 45, 46 and 51) to increase the hydraulic fluid flow through the radiator (13) comprises a first control line (28) controlling the emergency valve (29) and a second control line (37) branching off from the first control line (28) such that the emergency valve (29) is located between the variator (7) and the second control line (37) branching off from the first control line (28), and the second control line (37) leads to the lubrication valve (14) which is located in one an upstream position and a downstream position, relative to the radiator (13), and is actuated by a pressure change transmitted via the control line (37) in a manner such that in emergency operation the lubrication valve (14) increases a defined cross-sectional of the lubrication valve (14) for the emergency operation of the vehicle.

9. The hydraulic system according to claim 8, wherein the lubrication valve (14) is designed so that when a control pressure in the control line (37) is reduced relative to a normal operation pressure of the hydraulic system, the lubrication valve (14) increases the cross-sectional opening of the lubrication valve (14) for the emergency operation of the vehicle.

10. The hydraulic system according to claim 7, wherein the lubrication valve (14) is actuated to a maximum cross-sectional opening during the emergency operation of the vehicle.

11. The hydraulic system according to claim 4, wherein the lubrication valve (14) is shiftable in a manner such that the pressure in the control line (35, 37) acts against a force generated by an opposing spring (15).

12. The hydraulic system according to claim 4, wherein the pressure connection (35, 37, 43, 45, 46 and 51) to increase the flow of hydraulic fluid through the radiator (13) comprises a first line (41) connected to the downstream side of the radiator (13), and a second line (43), leading to the emergency valve (29), is connected to the first line (43) so that during emergency operation of the vehicle the emergency valve (29) is shifted so that the second line (43) communicate with a sump tank (44).

13. The hydraulic system according to claim 12, wherein a control line (28) leads to the emergency valve (29), the emergency valve (29) is shifted to provide communication between the second line (43) and the tank (44) when a pressure drop exists in the control line (28).

14. The hydraulic system according to claim 12, wherein a second line diaphragm (49) is situated in the second line (43).

15. The hydraulic system according to claim 12, wherein in the first line (41), connected to the downstream side of the radiator (13), has a first line diaphragm (42) situated in the first line (41) at a location downstream of the connection where the second line (43) branches off from the first line (41).

16. The hydraulic system according to claim 1, wherein the pressure connection (35, 37, 43, 45, 46 and 51) to increase the hydraulic fluid flow through the radiator (13) comprises a second line (51) which connects to a first line (41) communicating with the downstream side of the radiator (13), the second line (51) has a radiator pressure valve (45) which, when shifted during emergency operation of the vehicle, facilitates communication between the second line (51) with a sump tank (47).

17. The hydraulic system according to claim 16, wherein the radiator pressure valve (45) is designed as 2/2 directional valve with a connection to the tank (47) and a connection to the part of the second line (51) connected to the first line (41).

18. The hydraulic system according to claim 16, wherein in the first line (41) disposed on the downstream side of the radiator (13) has a first line diaphragm (42) situated in the first line (41) at a location downstream of the connection where the second line (51) branches off from the first line (41).

19. The hydraulic system according to claim 16, wherein the radiator pressure valve (45) is a recoil fluid valve and the recoil valve is situated in the second line (51) between the connection of the first line (41) to the second line (51) and a control pressure diaphragm (53) connected to a control pressure line (46).

20. The hydraulic system according to claim 16, wherein the radiator pressure valve (45) is located in the second line (51) between the connection of the first line (41) to the second line (51) and a control pressure diaphragm (53).

21. The hydraulic system according to claim 16, wherein the radiator pressure valve (45) is situated in the second line (51) between the connection of the first line (41) to the second line (51) and a control pressure diaphragm (53) connected to a control pressure line (46), and a sump tank diaphragm (55) is situated between the radiator pressure valve (45) and the sump tank (47).

22. The hydraulic system according to claim 16, wherein a second line diaphragm (49) is situated in the second line (51).

23. The hydraulic system according to claim 1, wherein a main pressure valve (5) supplies hydraulic fluid to both the lubricant circuit (10) and the system pressure circuit, and the main pressure valve (5) is controlled so that, during emergency operation of the vehicle, the main pressure valve (5) readjusts for a pressure loss occurring in the lubricant circuit (10).

24. The hydraulic system according to claim 1, wherein a hydrodynamic converter (11) is connected to the lubricant circuit (10).

25. The hydraulic system according to claim 1, wherein the lubricant valve is one of a 2/3 directional valve (14) and a 3/3 proportional valve (14B).

26. A hydraulic system for regulating a pressure actuation of a variator (7) of an automatic continuously variable transmission having an electronic transmission control, the hydraulic system comprising:

a lubricant circuit (10) connected to an oil source (4), the lubricant circuit having at least one lubrication valve (14), one radiator (13) and a hydraulic emergency operating device having at least one emergency valve (29) to adjust a constant pressure ratio between a primary pulley set (19) and a secondary pulley set (20) of the variator (7); and a pressure connection between the at least one lubrication valve (14) and the at least one emergency valve (29) to reduce a thermal load on the hydraulic system in an emergency operation, including at least one device (35, 37, 43, 45, 46, 51) which increases the oil flow through the radiator (13) during the emergency operation and reduces the pressure on an output side of the radiator (13); and within the lubricant circuit (10) of the hydraulic system, the at least one lubrication valve (14) is situated parallel to a bypass line (39) and located in one of an upstream and a downstream position relative to the radiator (13).

27. A hydraulic system for regulating a pressure actuation of a variator (7) of an automatic continuously variable transmission having an electronic transmission control, the hydraulic system comprising:

a lubricant circuit (10) connected to an oil source (4), the lubricant circuit having at least one lubrication valve (14), one radiator (13) and a hydraulic emergency operating device having at least one emergency valve (29) to adjust a constant pressure ratio between a primary pulley set (19) and a secondary pulley set (20) of the variator (7);

a pressure connection between the at least one lubrication valve (14) and the at least one emergency valve (29) to reduce a thermal load on the hydraulic system in an emergency operation, including at least one device (35, 37, 43, 45, 46, 51) which increases the oil flow through the radiator (13) during the emergency operation and reduces the pressure on an output side of the radiator (13); and wherein means to increase the flow of oil through the radiator (13) includes the at least one device (35, 37, 43, 45, 46, 51) having a first line (41) connected to the output side of the radiator (13) leading to a second line (43) leading to the emergency valve (29), the emergency valve (29) being designed so that in emergency operation the second line (43) is shifted to communicate with a sump tank (44).

* * * * *